us010166851B2

(12) United States Patent
Harada et al.

(10) Patent No.: US 10,166,851 B2
(45) Date of Patent: Jan. 1, 2019

(54) BELT MOLDING

(71) Applicant: SHIROKI CORPORATION, Fujisawa-shi, Kanagawa (JP)

(72) Inventors: Takashi Harada, Fujisawa (JP); Katsuhisa Fukui, Fujisawa (JP); Yasuhisa Suzuki, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 23 days.

(21) Appl. No.: 15/513,779

(22) PCT Filed: Sep. 28, 2015

(86) PCT No.: PCT/JP2015/077280
§ 371 (c)(1),
(2) Date: Mar. 23, 2017

(87) PCT Pub. No.: WO2016/052388
PCT Pub. Date: Apr. 7, 2016

(65) Prior Publication Data
US 2018/0222301 A1   Aug. 9, 2018

(30) Foreign Application Priority Data
Sep. 29, 2014 (JP) ................................ 2014-197930

(51) Int. Cl.
*B60J 10/50* (2016.01)
*B60J 10/75* (2016.01)
*B60J 10/27* (2016.01)

(52) U.S. Cl.
CPC ............... *B60J 10/50* (2016.02); *B60J 10/27* (2016.02); *B60J 10/75* (2016.02)

(58) Field of Classification Search
CPC ............. B60J 10/50; B60J 10/27; B60J 10/75
See application file for complete search history.

(56) References Cited

U.S. PATENT DOCUMENTS

| 9,937,777 B2 * | 4/2018 | Harada | .................... | B60J 10/18 |
| 2009/0133335 A1 * | 5/2009 | Tamura | .................... | B60J 10/18 |
| | | | | 49/489.1 |

(Continued)

FOREIGN PATENT DOCUMENTS

| JP | 04-48016 U | 4/1992 |
| JP | 07-5847 U | 1/1995 |

(Continued)

OTHER PUBLICATIONS

International Search Report (PCT/ISA/210) dated Nov. 13, 2015, by the Japanese Patent Office as the International Searching Authority for International Application No. PCT/JP2015/077280.

(Continued)

*Primary Examiner* — Gilbert Y Lee (74) *Attorney, Agent, or Firm* — Buchanan Ingersoll & Rooney PC (57) ABSTRACT

A belt molding that achieves a reduced separating/contacting noise includes a protrusion formed on an outer surface of a side portion, which is opposed to a glass, of a molding main body, a seal lip that is formed below the protrusion on the outer surface of the side portion, which is opposed to the glass, of the molding main body and is configured to be in contact with the glass, which rises and lowers, and is capable of being in contact with the protrusion when the glass is fully-closed. A skin is disposed on at least one of contacting portions among a seal lip contacting portion of the protrusion that contacts the seal lip and a protrusion contacting portion of the seal lip that contacts the protrusion. The skin is made of a harder material than a material of the protrusion or the seal lip that include the skin.

3 Claims, 5 Drawing Sheets

(56) References Cited

U.S. PATENT DOCUMENTS

| | | | |
|---|---|---|---|
| 2012/0207979 A1* | 8/2012 | Mutoh | B60J 10/75 |
| | | | 428/156 |
| 2013/0133267 A1* | 5/2013 | Kanazawa | B60J 10/0005 |
| | | | 49/475.1 |
| 2013/0174492 A1* | 7/2013 | Laycoe | B29C 47/0014 |
| | | | 49/475.1 |
| 2013/0270855 A1* | 10/2013 | Fukui | B60R 13/04 |
| | | | 296/146.1 |

FOREIGN PATENT DOCUMENTS

| | | |
|---|---|---|
| JP | 10-309944 A | 11/1998 |
| JP | 2010-285130 A | 12/2010 |
| JP | 2014-177210 A | 9/2014 |

OTHER PUBLICATIONS

Written Opinion (PCT/ISA/237) dated Nov. 13, 2015, by the Japanese Patent Office as the International Searching Authority for International Application No. PCT/JP2015/077280.

* cited by examiner

BELT MOLDING

TECHNICAL FIELD

The present invention relates to a belt molding disposed on an upper edge of an outer panel or an upper edge of an inner panel of a vehicular door including a glass that rises and lowers between the upper edge of the outer panel and the upper edge of the inner panel.

BACKGROUND ART

A belt molding is disposed on an upper edge of an outer panel of a vehicular door including a glass G (a window glass) that rises and lowers with a regulator between the upper edge of the outer panel and an upper edge of an inner panel.

Figure 5:
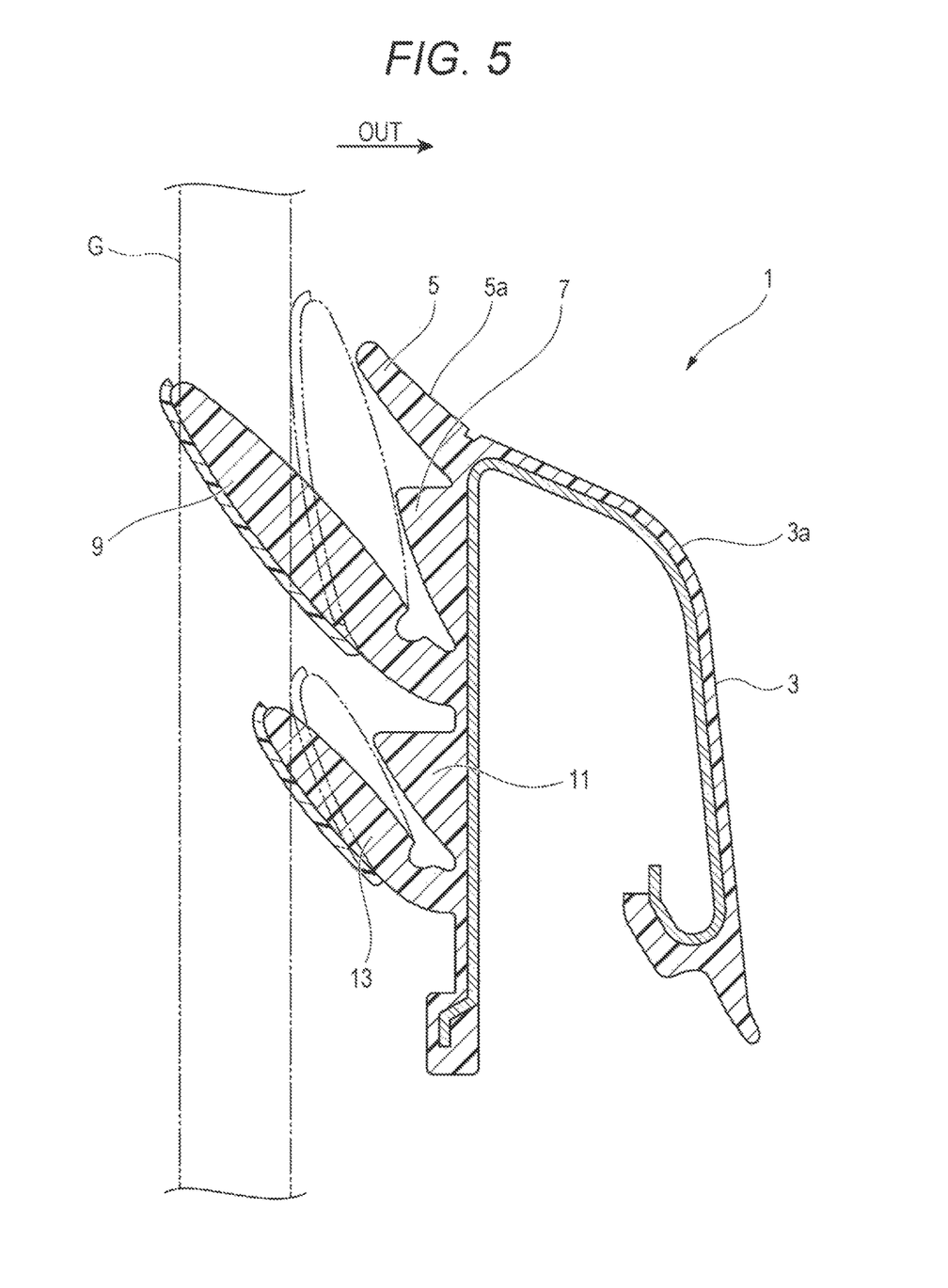
FIG. 5 is a cross-sectional view of a typical belt molding.

One example of this belt molding includes a belt molding having a configuration illustrated in FIG. 5. FIG. 5 is a cross-sectional view of a typical belt molding.

In the drawing, a belt molding 1 includes a molding main body 3. This molding main body 3 is installed on the upper edge of the outer panel and has a cross-sectional surface in an approximately U-shape.

A designing lip 5 is formed in a side portion of the molding main body 3. The designing lip 5 has a surface 5a that continues to a surface 3a, which is exposed outside the vehicle, of the molding main body 3.

Below the designing lip 5, an upper protrusion 7 and an upper seal lip 9 are formed. This upper seal lip 9 is formed below the upper protrusion 7 and is capable of being in contact with the upper protrusion 7 by being slidably in contact with the glass G, which rises and lowers, and elastically deforming.

Furthermore, a lower protrusion 11 and a lower seal lip 13 are formed in the side portion of the molding main body 3 and below the upper seal lip 9. This lower seal lip 13 is formed below the lower protrusion 11 and is elastically deformable in a direction of the upper protrusion 7.

Generally, the glass G curves in a vehicle-width direction. On the other hand, the regulator causes the glass G to rise and lower approximately linearly. Accordingly, when the glass G of the door is in a fully-closed state and furthermore, the glass G is pressed against a weather strip disposed in a door sash, the glass G slightly moves in a direction outside the vehicle (an arrow OUT direction in the drawing) in the vehicle-width direction of the vehicle.

The upper seal lip 9 is configured so as to be in contact with the upper protrusion 7 when the glass G is in the fully-closed state and moves in the arrow OUT direction and not to be in contact with the upper protrusion 7 when the glass G is in a state other than the fully-closed. This is because if the upper seal lip 9 comes in contact with the upper protrusion 7 while the glass G is rising or lowering, the upper seal lip 9 cannot escape in a direction separating from the glass G and a sliding resistance between the upper seal lip 9 and the glass G becomes large.

The upper seal lip 9 coming in contact with the upper protrusion 7 when the glass G is fully-closed reduces an amount of rain water that remains on the upper seal lip 9. Furthermore, an amount of rain water entering inside the door is also reduced.

The belt molding 1 is made of, for example, a soft thermoplastic elastomer (TPO) except for a core material 13 that is obtained by molding a thin plate of stainless steel (see, for example, PATENT LITERATURE 1).

CITATION LIST

Patent Literature

PATENT LITERATURE 1: JP-A-H10-309944

SUMMARY OF THE INVENTION

Problems to be Solved by the Invention

However, in the belt molding 1 having the configuration illustrated in FIG. 5, both the upper seal lip 9 and the upper protrusion 7 are made of a soft resin. Accordingly, when the upper seal lip 9 comes in contact with the upper protrusion 7 when the glass G is fully-closed or when the upper seal lip 9, which is in contact with the upper protrusion 7, separates from the upper protrusion 7 when the glass G in the fully-closed state lowers, the following problems are generated.

(1) In the case where the temperature is low, a contacting portion between the upper seal lip 9 and the upper protrusion 7, which are in contact, freeze to cause high peel strength. Then, when the glass G in the fully-closed state lowers and the upper seal lip 9 separates from the upper protrusion 7, an abnormal noise is generated.

(2) In the case where the temperature is high, the upper seal lip 9 and the upper protrusion 7, which are in contact, soften. When the upper seal lip 9 comes in contact with the upper protrusion 7 when the glass G is fully-closed, and when the upper seal lip 9, which is in contact with the upper protrusion 7, separates from the upper protrusion 7 when the glass in the fully-closed state lowers, an abnormal noise is generated.

These abnormal noises are referred to as a "separating/contacting noise" in the description.

The present invention has been made in view of the above-described problems. A purpose of the present invention is to provide a belt molding that achieves a reduced separating/contacting noise.

Solution to the Problems

In order to solve at least one of the above objects, a belt molding reflecting an aspect of the present invention is disposed on an upper edge of an outer panel of a vehicular door including a glass that rises and lowers from a slit between the upper edge of the outer panel and an upper edge of an inner panel. The belt molding includes a molding main body, a molding main body skin, a protrusion, and a seal lip. The molding main body is installed on the upper edge of the outer panel. The molding main body skin is formed on a surface of the molding main body that exposes outside the vehicle and made of a harder material than a material of the molding main body. The protrusion is formed on an outer surface of a side portion, which positions within the slit, of the molding main body and made of a softer material than a material of the skin. The seal lip is formed below the protrusion on the outer surface of the side portion, which positions within the slit, of the molding main body, made of a softer material than the material of the skin, and is capable of being in contact with the glass, which rises and lowers, and be in contact with the protrusion when the glass is fully-closed. At least one of contacting portions among a seal lip contacting portion of the protrusion that contacts the seal lip and a protrusion contacting portion of the seal lip that contacts the protrusion is made of a harder material than a hardness of the skin.

Other features of the present invention will be further apparent from the following description of the embodiments and the accompanying drawings.

Effect of the Invention

With the belt molding of the present invention, at least one of the contacting portions among the seal lip contacting portion of the protrusion that contacts the seal lip and the protrusion contacting portion of the seal lip that contacts the protrusion is made of a harder material than the hardness of the skin. This reduces a separating/contacting noise generated when the seal lip comes in contact with the protrusion or the seal lip, which is in contact with the protrusion, separates from the protrusion.

Other advantageous effects of the present invention will be further apparent from the following description of the embodiments and the accompanying drawings.

DESCRIPTION OF THE EMBODIMENTS

First Embodiment

Figure 3:
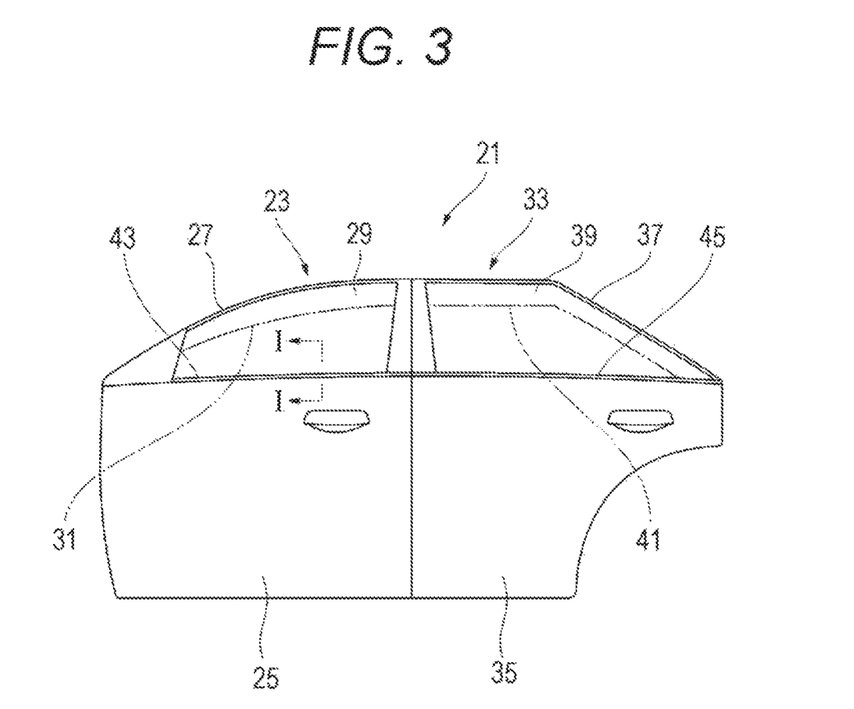
FIG. 3 is a side view of a vehicle in which a belt molding of a first embodiment is disposed.

First, an overall configuration of a belt molding of a first embodiment will be described using FIG. 3. FIG. 3 is a side view of a vehicle in which the belt molding of the first embodiment is disposed.

In FIG. 3, an outer panel 25 and a door sash 27 of a front door 23 of a vehicle 21 are made of metal. Between the outer panel 25 and the door sash, a window hole 29 is formed. In the window hole 29, a glass 31 that positions between the outer panel 25 and an inner panel (not illustrated) is disposed so as to freely rise and lower.

Similarly, an outer panel 35 and a door sash 37 of a rear door 33 are made of metal. Between the outer panel 35 and the door sash 37, a window hole 39 is formed. In the window hole 39, a glass 41 that positions between the outer panel 35 and an inner panel (not illustrated) is disposed so as to freely rise and lower.

A belt molding 43 is secured on an upper edge of the outer panel 25 of the front door 23. A belt molding 45 is secured on an upper edge of the outer panel 35 of the rear door 33. The belt molding 43 of the front door 23 and the belt molding 45 of the rear door 33 have identical cross-sectional surfaces. Therefore, the following describes the belt molding 43 of the front door 23. The description of the belt molding 45 of the rear door 33 is omitted.

Figure 1:
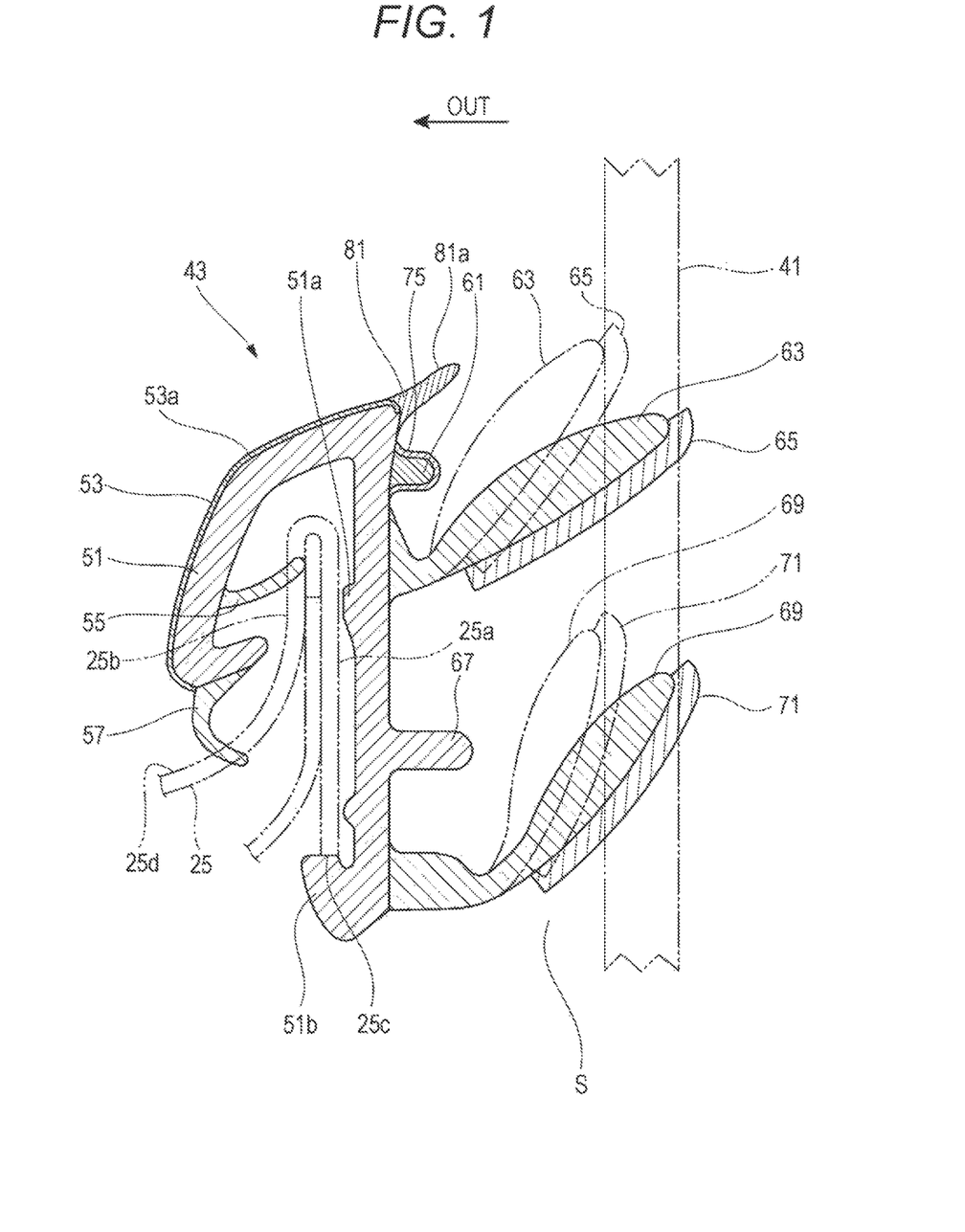
FIG. 1 is a cross-sectional view at section line I-I in FIG. 3.

Next, using FIG. 1, a structure of the belt molding 43 will be described. FIG. 1 is a cross-sectional view at section line I-I in FIG. 3.

In FIG. 1, a molding main body 51 made of a hard resin, such as polypropylene (PP) and having a cross-sectional surface in an inverse U-shape is installed on the upper edge of the outer panel 25.

On a surface that exposes outside the vehicle of this molding main body 51, a molding main body skin 53 is formed. This molding main body skin 53 is made of, for example, a softer resin than a material of the molding main body 51, such as a hard olefin-based elastomer (hard TPO).

On an outer surface of a side portion, which is opposed to a glass 41, of the molding main body 51, a designing lip 81 is formed. The designing lip 81 has a surface 81a that continues to a surface 53a, which is exposed outside the vehicle, of the molding main body skin 53 of the molding main body 51.

A contacting portion 51a is formed integrally with the molding main body 51 inside the molding main body 51. This contacting portion 51a is capable of being in contact with a surface 25a on a vehicle inward side in the upper edge of the outer panel 25 from the vehicle inward side. Inside the molding main body 51, a lip 55 is formed. The lip 55 is capable of elastically deforming and being pressed against a surface 25b on a vehicle outward side in the upper edge of the outer panel 25 from the vehicle outward side. This lip 55 is made of, for example, a soft resin having elasticity, such as the olefin-based elastomer (TPO). Accordingly, when the molding main body 51 of the belt molding 43 is inserted into the upper edge of the outer panel 25 from above, the contacting portion 51a formed on the molding main body 51 comes in contact with the surface 25a of the outer panel 25. Then, the lip 55 formed on the molding main body 51 is pressed against the outer panel 25 from vehicle outward side. This ensures installing the belt molding 43 on the outer panel 25 without a backlash in a vehicle width direction.

Furthermore, a retainer 51b is formed integrally with the molding main body 51 in a lower portion of the molding main body 51 on the vehicle inward side. This retainer 51b includes a surface that is capable of being in contact with a lower end surface 25c of the outer panel 25 on the vehicle inward side. A lip 57 is formed in a lower portion of the molding main body 51 on the vehicle outward side. The lip 57 is capable of elastically deforming and being pressed against a shoulder part 25d of the outer panel 25 on the vehicle outward side from above. This lip 57 is made of, for example, a soft resin having elasticity, such as the olefin-based elastomer (TPO). When the belt molding 43 is installed on the outer panel 25, the lip 57 is pressed against the shoulder part 25d of the outer panel 25 on the vehicle outward side. Then, by elastic resilience of the lip 57, the belt molding 43 is biased upward. This brings the retainer 51b of the molding main body 51 in contact with the lower end surface 25c of the outer panel 25 on the vehicle inward side. Accordingly, the belt molding 43 is installed on the outer panel 25 without a backlash in a vehicle vertical direction.

An upper protrusion 61 is formed on an outer surface of the side portion, which positions within a slit S (a clearance in which the glass 41 positions between the outer panel 25 and the inner panel), of the molding main body 51, that is, the outer surface of the side portion, which is opposed to the glass 41, of the molding main body 51. This upper protrusion 61 is made of, for example, a softer resin than that of the molding main body skin 53, such as the olefin-based elastomer (TPO).

An upper seal lip 63 that is capable of being in contact with the glass 41, which rises and lowers, is formed below the upper protrusion 61 on the outer surface of the side portion, which positions within the slit 5, of the molding main body 51, that is, on the outer surface of the side portion, which is opposed to the glass 41, of the molding main body 51. This upper seal lip 63 is made of, for example, a softer resin than that of the molding main body skin 53, such as the olefin-based elastomer (TPO). In this embodiment, a side surface of the upper seal lip 63 on the vehicle inward side includes a hair portion 65 that slidably contacts the glass 41, which rises and lowers, to remove dust and water vapor accumulated on a surface of the glass 41.

Over a whole surface of the upper protrusion 61, a protrusion skin 75 is formed. Accordingly, the protrusion skin 75 reaches a surface of the molding main body 51. This protrusion skin 75 is made of, for example, a resin that is harder and has higher rigidity than the material of the upper protrusion 61 (the olefin-based elastomer (TPO)), such as the olefin-based elastomer (hard TPO) or high-crystallinity polypropylene.

A lower protrusion 67 is formed below the upper seal lip 63 on the outer surface of the side portion, which positions within the slit S, of the molding main body 51, that is, on the outer surface of the side portion, which is opposed to the glass 41, of the molding main body 51. This lower protrusion 67 is made of, for example, a softer resin than that of the molding main body skin 53, such as the olefin-based elastomer (TPO).

A lower seal lip 69 that is capable of being in contact with the glass 41, which rises and lowers, is formed below the lower protrusion 67 on the outer surface of the side portion, which positions within the slit S, of the molding main body 51, that is, on the outer surface of the side portion, which is opposed to the glass 41, of the molding main body 51. A material of this lower seal lip 69 is made of, for example, a softer resin than that of the molding main body skin 53, such as the olefin-based elastomer (TPO). A side surface of the lower seal lip 69 on the vehicle inward side includes a hair portion 71 that slidably contacts the glass 41, which rises and lowers, to remove dust and water vapor accumulated on the surface of the glass 41.

Here, FIG. 1 illustrates the upper seal lip 63 and the hair portion 65 in a solid line and the lower seal lip 69 and the hair portion 71 in the solid line that are in a state of not contacting the glass 41. FIG. 1 illustrates the upper seal lip 63 and the hair portion 65 in a two-dot chain line and the lower seal lip 69 and the hair portion 71 in the solid line that are in a state of contacting the glass 41 at times other than fully-closed.

In the case where the upper seal lip 63 and the hair portion 65 is in contact with the glass 41 at times other than fully-closed, the upper seal lip 63 is not in contact with the protrusion skin 75 of the upper protrusion 61.

Figure 2:
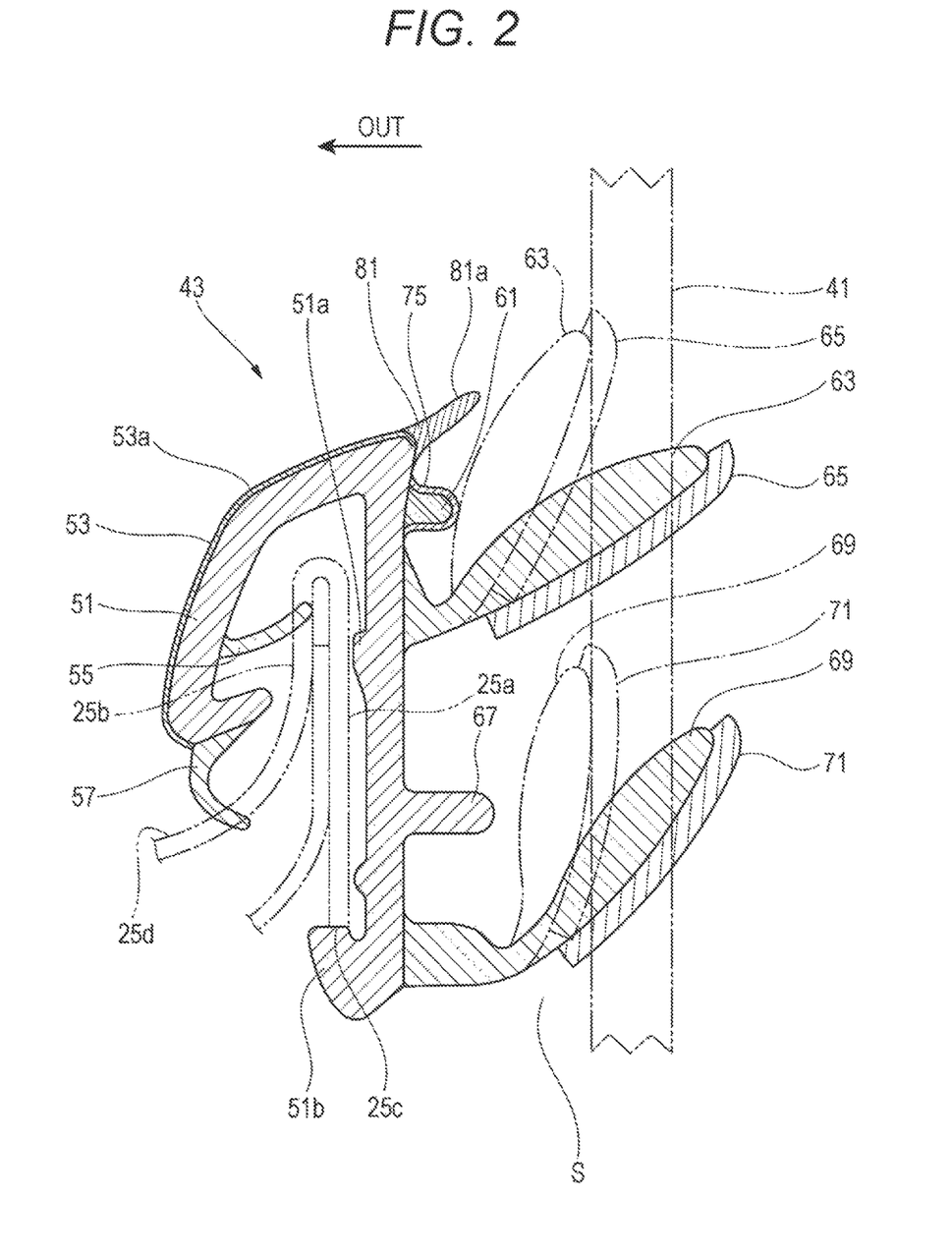
FIG. 2 is a drawing describing when a glass is fully-closed in FIG. 1.

When the glass 41 of the door is in a fully-closed state, the glass 41 slightly moves in a direction outside the vehicle (an arrow OUT direction in FIG. 1) in the vehicle-width direction of the vehicle as described in the background. This state will be described using FIG. 2. FIG. 2 is a drawing describing when the glass is fully-closed in FIG. 1.

The upper seal lip 63 and the hair portion 65 in the solid line and the lower seal lip 69 and the hair portion 71 in the solid line that are in the state of not contacting the glass 41 are illustrated. The upper seal lip 63 and the hair portion 65 in the two-dot chain line and the lower seal lip 69 and the hair portion 71 in the solid line that are in the state of contacting the glass 41 at times other than fully-closed are illustrated.

The glass 41 moving in the direction outside the vehicle brings the upper seal lip 63 in contact with the protrusion skin 75 of the upper protrusion 61.

With this embodiment, the following advantageous effects are obtained.

(1) The protrusion skin 75 of the upper protrusion 61 with which the upper seal lip 63 comes in contact when the glass 41 is fully-closed is made of, for example, a resin that is harder and has higher rigidity than the material of the upper protrusion 61 (the olefin-based elastomer (TPO)), such as the olefin-based elastomer (hard TPO) or the high-crystallinity polypropylene. Accordingly, a separating/contacting noise generated when the upper seal lip 63 comes in contact with the protrusion skin 75 of the upper protrusion 61 or when the upper seal lip 63, which is in contact with the skin protrusion 75 of the upper protrusion 61, separates from the protrusion skin 75 of the upper protrusion 61 is reduced.

(2) The protrusion skin 75 is formed over the whole surface of the upper protrusion 61. This protrusion skin 75 is made of, for example, a resin that is harder and has higher rigidity than the material of the upper protrusion 61 (the olefin-based elastomer (TPO)), such as the high-crystallinity polypropylene. Accordingly, the protrusion skin 75 reaches the outer surface of the side portion, which is opposed to the glass 41, of the molding main body 73.

In view of this, stretching strength (flexural rigidity) of the upper protrusion 61 becomes high. As a result, when the upper seal lip 63 comes in contact with the upper protrusion 61, a seal performance between the upper seal lip 63 and the upper protrusion 61 improves.

Accordingly, an amount of rain water that remains on the upper seal lip 63 is reduced. Furthermore, an amount of rain water entering inside the door is reduced.

The upper seal lip 63 contacting the designing lip 81 and the upper seal lip 63 strongly interfering with the designing lip 81 can be prevented.

In this embodiment, the lower protrusion 67 is formed as a spare in the case where the advantageous effects of the upper protrusion 61 is lost due to a permanent set and the like.

Second Embodiment

Figure 4:
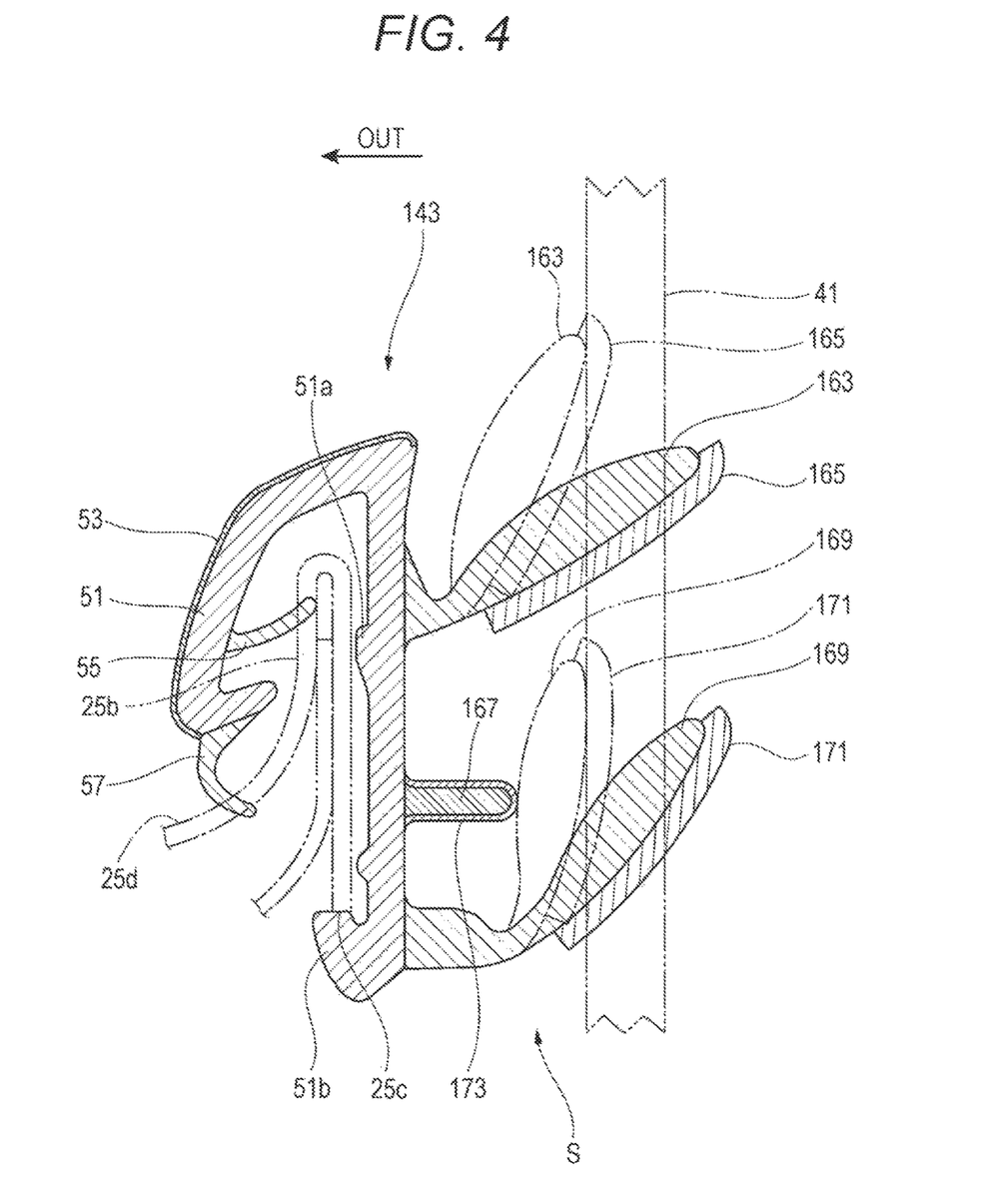
FIG. 4 is a drawing describing a second embodiment.

The description will be given using FIG. 4. FIG. 4 is a drawing describing a second embodiment. Difference between the first embodiment and the second embodiment is a protrusion and a seal lip disposed on the outer surface of the side portion, which positions within the slit S, of the molding main body, that is, on the outer surface of the side portion, which is opposed to the glass, of the molding main body. The configuration of other parts is identical to the first embodiment. Therefore, in FIG. 4, the same reference numerals are given to parts identical to the parts illustrated in FIGS. 1 to 3, which illustrate the first embodiment, and the repeated description will be omitted.

In the drawing, an upper seal lip 163 that is capable of being in contact with the glass 41, which rises and lowers, is formed on the outer surface of the side portion, which positions within the slit S (the clearance in which the glass 41 is positioned between the outer panel 35 and the inner panel), of the molding main body 51, that is, the outer surface of the side portion, which is opposed to the glass 41, of the molding main body 51. The material of this upper seal lip 163 is made of, for example, a softer resin than that of the molding main body skin 53, such as the olefin-based elastomer (TPO). In this embodiment, a side surface of the upper seal lip 163 on the vehicle inward side includes a hair portion 165 that slidably contacts the glass 41, which rises and lowers, to remove dust and water vapor accumulated on the surface of the glass 41.

A lower protrusion 167 is formed below the upper seal lip 163 on the outer surface of the side portion, which positions within the slit S, of the molding main body 51, that is, on the outer surface of the side portion, which is opposed to the glass 41, of the molding main body 51. This lower protrusion 167 is made of, for example, a softer resin than that of the molding main body skin 53, such as the olefin-based elastomer (TPO).

A lower seal lip 169 that is capable of being in contact with the glass 41, which rises and lowers, is formed below the lower protrusion 167 on the outer surface of the side portion, which positions within the slit S, of the molding main body 51. The material of this lower seal lip 169 is made of, for example, a softer resin than that of the molding main body skin 53, such as the olefin-based elastomer (TPO). In this embodiment, a side surface of the lower seal lip 169 on the vehicle inward side includes a hair portion 171 that slidably contacts the glass 41, which rises and lowers, to remove dust and water vapor accumulated on the surface of the glass 41.

Over a whole surface of the lower protrusion 167, a protrusion skin 173 is formed. Accordingly, the protrusion skin 173 reaches the surface of the molding main body 51. This protrusion skin 173 is made of, for example, a resin that is harder and has higher rigidity than the material of the lower protrusion 167 (the olefin-based elastomer (TPO)), such as the high-crystallinity polypropylene.

The upper seal lip 163 and the hair portion 165 in the solid line and the lower seal lip 169 and the hair portion 171 in the solid line that are in the state of not contacting the glass 41 are illustrated. The upper seal lip 163 and the hair portion 165 in the two-dot chain line and the lower seal lip 169 and the hair portion 171 in the solid line that are in the state of contacting the fully-closed glass 41 are illustrated.

As illustrated in the drawing, the lower seal lip 169 is in contact with the protrusion skin 173 of the lower protrusion 167 when the glass 41 is fully-closed. Similar to the first embodiment, the lower seal lip 169 does not come in contact with the protrusion skin 173 of the lower protrusion 167 at times other than the glass 41 is fully-closed.

With this embodiment, the following advantageous effects are obtained.

(1) The protrusion skin 173 of the lower protrusion 167 with which the lower seal lip 169 comes in contact when the glass 41 is fully-closed is made of, for example, a resin that is harder and has higher rigidity than the material of the lower protrusion 167 (the olefin-based elastomer (TPO)), such as the high-crystallinity polypropylene. Accordingly, the separating/contacting noise generated when the lower seal lip 169 comes in contact with the protrusion skin 173 of the lower protrusion 167 or when the lower seal lip 169, which is in contact with the skin protrusion 173 of the lower protrusion 169, separates from the protrusion skin 173 of the lower protrusion 167 is reduced.

(2) The protrusion skin 173 is formed over the whole surface of the lower protrusion 167. The protrusion skin 173 is made of, for example, a resin that is harder and has higher rigidity than the material of the lower protrusion 167 (the olefin-based elastomer (TPO)), such as the high-crystallinity polypropylene. Accordingly, the protrusion skin 173 reaches the surface of the molding main body 51.

In view of this, the stretching strength (flexural rigidity) of the lower protrusion 169 becomes high. Therefore, when the lower seal lip 169 comes in contact with the lower protrusion 167, the seal performance between the upper seal lip 63 and the upper protrusion 61 improves.

The present invention is not limited to the above-described embodiments (the first embodiment and the second embodiment). A protrusion skin of a protrusion with which a seal lip comes in contact is not necessarily formed over a whole surface of the protrusion. The separating/contacting noise can be reduced when at least the protrusion skin is formed in a contacting portion with the seal lip.

A seal lip skin made of a material harder than the seal lip may be formed in the contacting portion of the seal lip with the protrusion, instead of forming the protrusion skin made of a material harder than the protrusion on the protrusion.

Furthermore, the seal lip skin made of the material harder than the seal lip and the protrusion skin made of the material harder than the protrusion may be formed on both the contacting portion of the protrusion with the seal lip and the contacting portion of the seal lip with the protrusion.

As an example of the belt molding of the above-described embodiments, a belt molding disposed on an upper edge of an outer panel of a door has been described. However, it is needless to say that the present invention is applicable to a belt molding disposed on an upper edge of an inner panel of a door.

This application claims priority from Japanese Patent Application No. 2014-197930 filed with the Japan Patent Office on Sep. 29, 2014, the entire content of which is hereby incorporated by reference.

The above description of specific embodiments of the present invention is disclosed as illustrative. This does not intend to be exhaustive or limit the present invention to the described embodiments as they are. Many modifications and variations will be apparent to one of ordinary skill in the art in light of the above teachings.

LIST OF REFERENCE NUMERALS

43: Belt molding
51: Molding main body
53: Molding main body skin (skin)
61: Upper protrusion (protrusion)
63: Upper seal lip (seal lip)
75: Protrusion skin

The invention claimed is:

1. A belt molding disposed on an upper edge of an outer panel or an upper edge of an inner panel of a vehicular door including a glass that rises and lowers between the upper edge of the outer panel and the upper edge of the inner panel, the belt molding comprising:
    a molding main body installed on the upper edge of the outer panel or the upper edge of the inner panel;
    a protrusion formed on an outer surface of a side portion of the molding main body, the side portion being opposed to the glass; and
    a seal lip formed below the protrusion on the outer surface of the side portion of the molding main body, the seal lip being configured to be in contact with the glass that rises and lowers, the seal lip being capable of being in contact with the protrusion when the glass is fully-closed, wherein
    the belt molding includes a skin on a seal lip contacting portion of the protrusion that contacts the seal lip,
    the skin is made of a harder material than a material of the protrusion, and
    the skin covers the outer surface of the side portion of the molding main body.

2. The belt molding according to claim 1, wherein
    the belt molding includes a designing lip shorter than the seal lip above the protrusion on the outer surface of the side portion of the molding main body.

3. A belt molding disposed on an upper edge of an outer panel or an upper edge of an inner panel of a vehicular door including a glass that rises and lowers between the upper edge of the outer panel and the upper edge of the inner panel, the belt molding comprising:
- a molding main body installed on the upper edge of the outer panel or the upper edge of the inner panel;
- a protrusion formed on an outer surface of a side portion of the molding main body, the side portion being opposed to the glass; and
- a seal lip formed below the protrusion on the outer surface of the side portion of the molding main body, the seal lip being configured to be in contact with the glass that rises and lowers, the seal lip being capable of being in contact with the protrusion when the glass is fully-closed, wherein
- the belt molding includes a skin on a protrusion contacting portion of the seal lip that contacts the protrusion,
- the skin is made of a harder material than a material of the seal lip, and
- the belt molding includes a designing lip shorter than the seal lip above the protrusion on the outer surface of the side portion of the molding main body.

* * * * *